April 19, 1927.  1,625,560

H. MORRIS

STONE PICKER

Filed March 29, 1924   3 Sheets-Sheet 3

Inventor
H. Morris.
By
Attorney

Patented Apr. 19, 1927.

1,625,560

UNITED STATES PATENT OFFICE.

HERBERT MORRIS, OF SOUTH VALLEY, NEW YORK.

STONE PICKER.

Application filed March 29, 1924. Serial No. 702,834.

This invention provides a machine for gathering stones, clods and other material and dumping the same in a pile.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
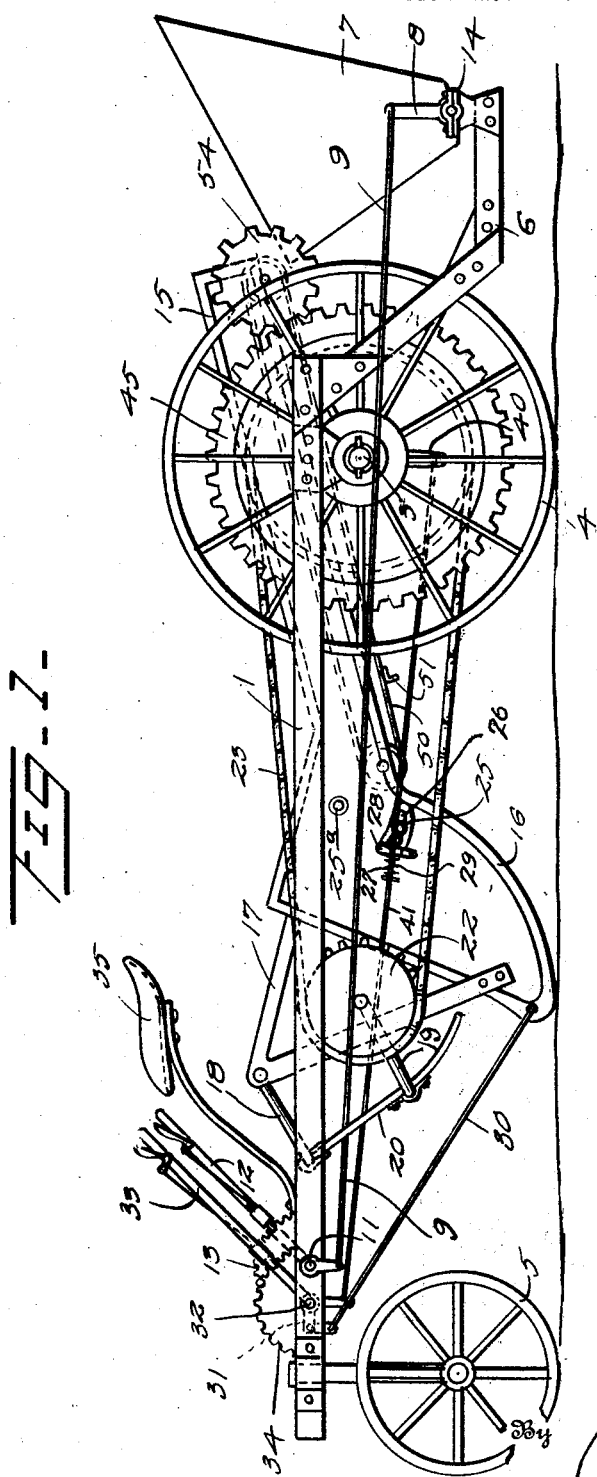
Figure 2:
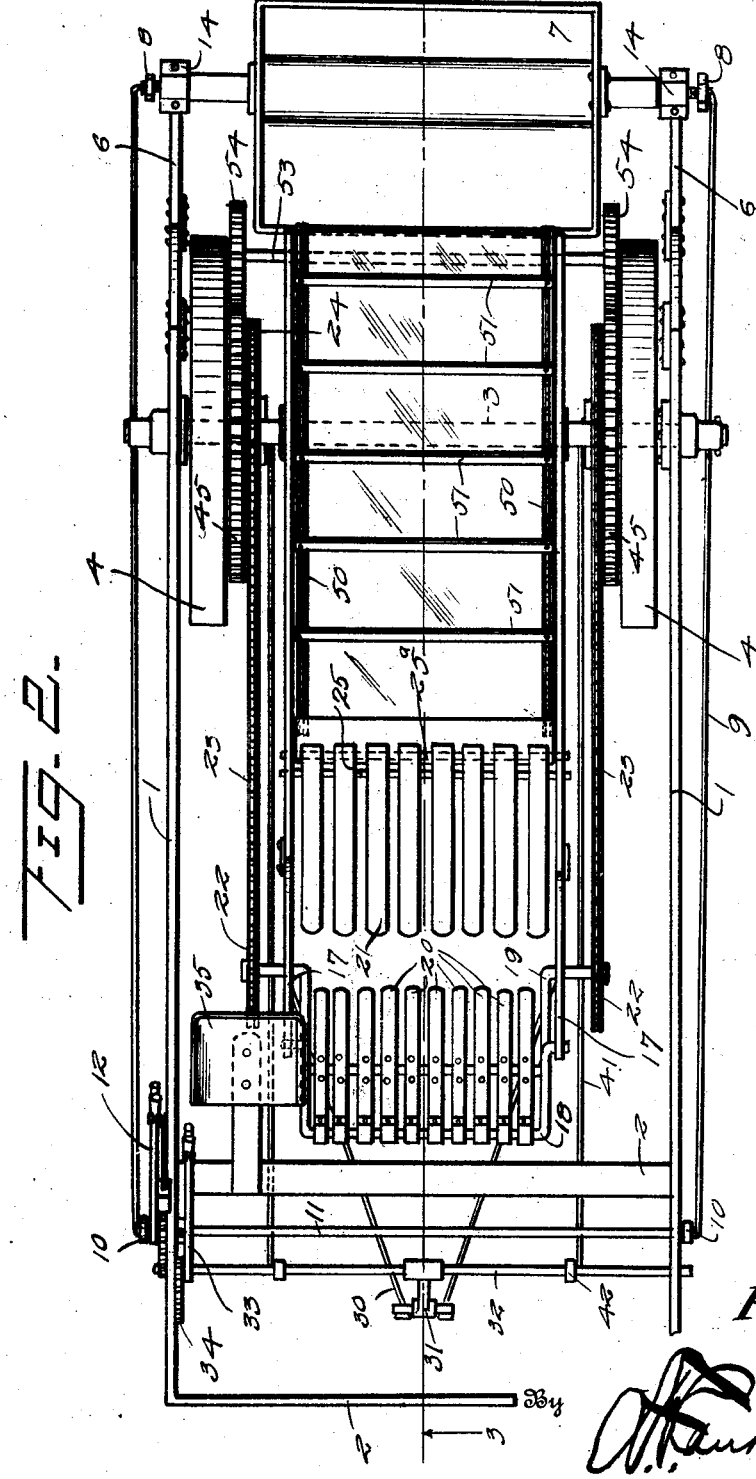
Figure 3:
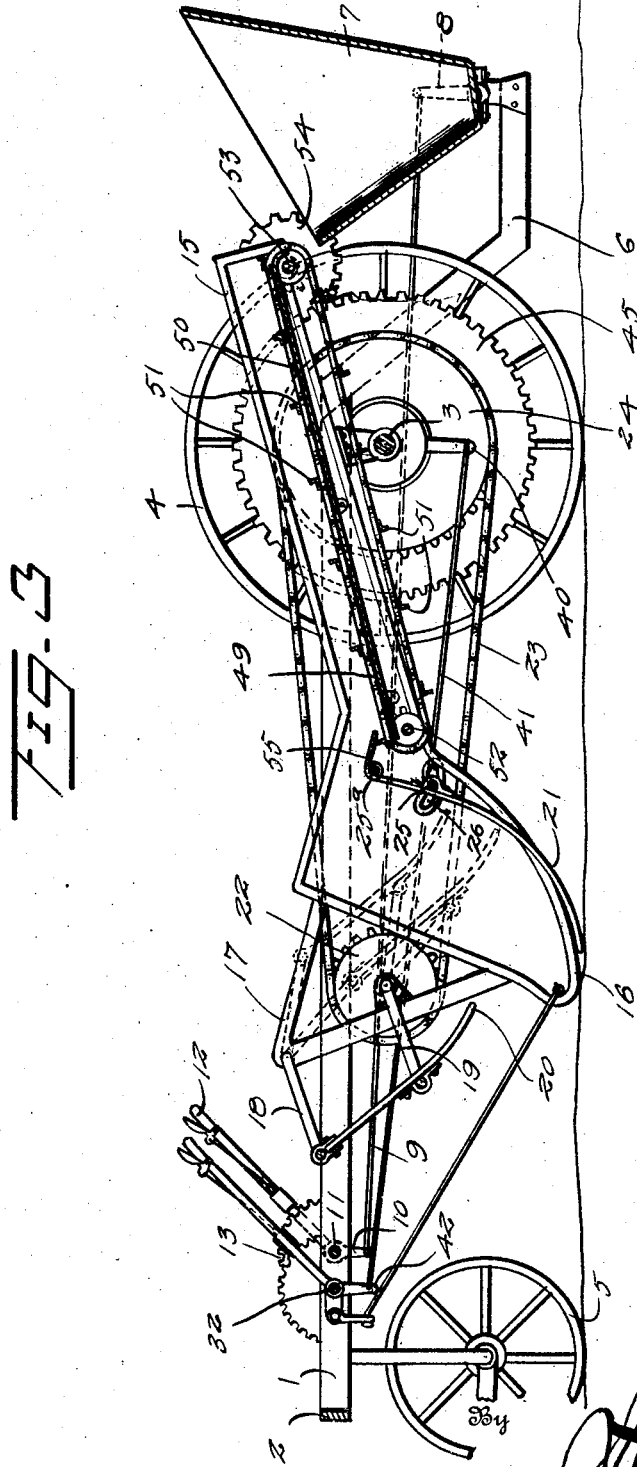

Referring to the accompanying drawings forming a part of the application:

Figure 1 is a side view of a machine for gathering stones embodying the invention, Figure 2 is a top plan view thereof, and Figure 3 is a vertical longitudinal section on the line 3—3 of Figure 2.

Corresponding and like parts are referred to in the following description and designated in the several views of the drawings by like reference characters.

The main frame comprises side bars 1 and a crossbar 2 and is provided with an axle 3 upon which are mounted wheels 4 which constitute drivers for actuating the operating mechanism. The numeral 5 designates a front rotary support of any preferred construction and arrangement. The side bars 1 are offset downwardly at their rear ends, as indicated most clearly in Figures 1 and 3 and the offset portion 6 pivotally supports a bucket 7 which is adapted to tilt rearwardly and downwardly so as to dump the stones or other material in a pile. The bucket is fast to a shaft which is provided with an arm 8 at each end and rods 9 connect the arms 8 with arms 10 fast to a transverse shaft 11 to which is attached an operating lever 12 provided with a latch to coact with a toothed segment 13 whereby to hold the bucket in the required adjusted position. The bucket shaft is mounted in bearings 14. An elevator frame 15 is pivotally mounted upon the axle 3 and its front portion includes an extension 16 which is pendent and inclined forwardly, as indicated most clearly in Figures 1 and 3. A bracket 17 projects forwardly from each side member of the frame 15 and supports two crank shafts 18 and 19 upon which are mounted teeth 20 which constitute a gathering rake. The crank shaft 19 is positively rotated whereas the crank shaft 18 operates as a guide. In the operation of the machine, a rotative movement is imparted to the gathering rake 20 and on the gathering stroke it is lowered, moved rearwardly and elevated, thereby picking up the stones, clods and other material and moving the same over the elevating rake 21. On the return stroke, the gathering rake 20 is elevated and moved forwardly. A sprocket gear 22 is fast to each end of the crank shaft 19 and a sprocket chain 23 connects the same with a sprocket wheel 24 loosely mounted on the axle 3.

The elevating rake 21 comprises a plurality of teeth which are pivoted to a transversely disposed rod 25ª and attached to a transversely disposed member 25 which projects through slots 26 formed in the extensions 16 of the elevator frame 15, yielding means being provided as indicated at 27 to prevent injury or shock to the gathering mechanism. The elevating rake 21 inclines forwardly and downwardly and the gathering rake 20 sweeps thereover and acts jointly therewith to carry the stones and other material to the elevator which conveys them to the bucket 7. The front end of the elevator frame may be raised or lowered, thereby correspondingly adjusting the gathering mechanism mounted thereon. For this purpose rods 30 are attached at their lower rear ends to the lower forward portion of the elevator frame and are connected at their upper forward ends to an arm 31 fast to a transversely disposed shaft 32 which is provided at one end with an operating lever 33 which is provided with the usual latch to coact with a toothed segment 34, whereby to hold the frame in the required adjusted position. The levers 12 and 33 are located upon the same side of the machine and within easy reach of the driver's seat 35.

An arm 40 is connected with a suitable clutch mechanism and is operated by means of a rod 41 pivotally engaging an arm 42 fast to the shaft 32, said clutch controlling the engagement of gear wheel 45 with the drive wheel 4, sprocket wheel 24 being secured for rotation with said gear wheel 45. As a result, the machine is thrown out of gear when the gathering mechanism is elevated and into gear when the gathering mechanism is lowered into operative position. This is of advantage when turning the machine at the end of a row or when moving the same from one place to another, the lifting of the gathering mechanism from the ground simultaneously throwing the machine out of gear.

The elevator comprises a table 49, endless chains 50 at opposite sides of the table and lags 51 attached to the endless chains 50 and arranged to move over the table 49. Shafts 52 and 53 are disposed at opposite ends of the table 49 and receive sprocket wheels around which the sprocket chain 50 pass. The shaft 53 is extended at opposite ends and provided with pinions 54 which are in mesh with the gear wheel 45. It will thus be understood that the elevator is thrown into and out of gear simultaneously with the gathering mechanism. A deflector 55 extends across the space formed between the upper end of the elevating rake 21 and the lower end of the elevator and prevents dropping of the stones or other material into said space and insures a delivery of the same to the elevator. The deflector 55 is pivotally mounted upon the shaft 25 and its rear end is free to rise and fall as the lags 51 pass thereunder.

The arrangement is such that the teeth 20 and 21 may be adjusted or more or less teeth placed in position, whereby to vary the spaces between them according to the size of the stones, clods or other materials to be gathered. When the machine is in operation, the lower front end of the elevator frame 15 may trail upon the ground or be adjusted to approach close thereto so that the teeth of the elevating rake 21 may engage the stones, clods or other material to be gathered. The gathering rake lifts and moves the material over the elevating rake 21 and discharges at the upper end thereof upon the deflector 55 which directs the material to the elevator and the latter in turn moves the same over the table 49 and delivers it into the bucket 7 and when the latter is filled it is tilted, thereby discharging the stones or other material in a pile.

What is claimed is:

A picking machine of the character specified comprising a main frame having a rear depressed portion, a bucket, a shaft rigid with the bucket and journaled on said portion, gathering mechanism carried by the machine including an elevator, said bucket being arranged to receive material from the elevator, a crank extending from said shaft, and an operative connection for said crank whereby the bucket may be tilted for emptying and may be secured in normal receiving position.

In testimony whereof I affix my signature.

HERBERT MORRIS.